United States Patent [19]

Sakamoto

[11] Patent Number: 4,864,571
[45] Date of Patent: Sep. 5, 1989

[54] INFORMATION RECORDING/REPRODUCING APPARATUS WITH PRIORITIZED READ OUT

[75] Inventor: Shunichiro Sakamoto, Saitama, Japan

[73] Assignee: Pioneer Electronic Corporation, Tokyo, Japan

[21] Appl. No.: 98,829

[22] Filed: Sep. 21, 1987

[30] Foreign Application Priority Data

Sep. 19, 1986 [JP] Japan .................... 61-143535[U]

[51] Int. Cl.$^4$ .................................... G06F 11/10
[52] U.S. Cl. ................................. 371/40.3
[58] Field of Search ............ 371/38, 39, 40, 13; 360/53, 38.1; 365/200

[56] References Cited

U.S. PATENT DOCUMENTS

| | | | |
|---|---|---|---|
| 4,527,273 | 7/1985 | Hibi | 371/38 |
| 4,682,333 | 7/1987 | Onishi | 371/39 |
| 4,758,902 | 7/1988 | Okamoto | 371/38 X |

Primary Examiner—Jerry Smith
Assistant Examiner—Robert W. Beausoliel
Attorney, Agent, or Firm—Sughrue, Mion, Zinn, Macpeak & Seas

[57] ABSTRACT

An information recording/reproducing apparatus includes a signal reproducer for reading various types of data, from a recording medium, and a signal processor for converting and correcting the data in the signals and associating a correction flag with each particular data to indicate whether the data is correct (i.e. corrected after read out or correct upon read out) or incorrect (i.e. incorrect upon read out and uncorrectable). The data and associated flag are stored in the memory. The signal processor then generates a permission signal which is sent to a control device. To read out data, the control device generates selection signals, and data, which are received by the signal processor. An address generator in the signal processor generates a predetermined address of the particular data stored in the memory which corresponds to the received selection signal and data. The signal processor also detects whether the correction flag associated with the data being read out corresponds to correct or incorrect data, and then reads out the correct data from the memory before reading the incorrect data.

8 Claims, 6 Drawing Sheets

| PACK1 ITEM | | C1 ERROR FG |
|---|---|---|
| PACK3 ITEM | PACK2 ITEM | |
| PACK5 ITEM | PACK4 ITEM | |
| PACK7 ITEM | PACK6 ITEM | |

| ID 5 | ID 6 | ID 7 | F | P |
|------|------|------|---|---|
| ID 1 | ID 2 | ID 3 | ID 4 | |
| FRAME ADDRESS | | BLOCK ERROR RATE | | |

FIG. 16

| CTL - ID | | P | PNO - 1 | |
|----------|--|---|---------|--|
| PNO - 2 | | | PNO - 3 | |
| 1 | FORMAT - ID | | DATA - ID | |

INFORMATION RECORDING/REPRODUCING APPARATUS WITH PRIORITIZED READ OUT

The present invention relates to an information recording/reproducing apparatus such as an R-DAT (rotary-head digital audio tape recorder), an 8-mm video tape recorder, or the like.

In a recently standardized R-DAT, a magnetic tape is wound on a rotary drum by about 90 degrees and information is recorded/reproduced by a rotary head. An inclined track is broadly divided into three regions such that two sub-code regions SUB-1 and SUB-2 are disposed at both sides of an intermediate PCM region. A PCM audio signal is recorded in the PCM region and a predetermined sub-code signal is recorded in each of the sub-code regions. The sub-code signal may include the following: a controlling ID (identifier), such as a starting ID used as an index signal, a skipping (shortening) ID for performing skipping of the track to the next starting ID, etc.; a data ID representing the program number; and the like. The data to be recorded for the sub-code may include pack (PACK) data formed of eight symbols (64 bits). The pack data can represent program time, absolute time, a calendar, a table of contents (TOC) information, and the like.

The pack data are required to be relatively frequently read out because of characteristics of the pack data. However, it is difficult to efficiently and accurately read out the pack data, particularly in the case where a magnetic tape is run at a high speed.

SUMMARY OF THE INVENTION

This invention eliminates the foregoing disadvantages in the prior art by providing an information recording/reproducing apparatus in which data corresponding to a correction flag representing correct (or corrected) data are read out prior to other data.

According to the invention, the information recording/reproducing apparatus includes: a memory for storing a signal reproducing from a recording medium together with a correction flag corresponding to the signal; address generation means for generating a predetermined address corresponding to a selection signal for selecting data stored in the memory; and detection means for detecting the correction flag in the data read out of the memory, so that the data which correspond to the correction flag which represents correct (or corrected) data are read out prior to other data.

The signal reproduced from the recording medium is stored once in the memory together with the correction flag after correction of an error of the reproduced signal. The thus stored data are read out corresponding to the selection signal, and at this time the correction flag is detected so that data having the correction flag representing correctable (corrected or correct) data are read out prior to other data.

BRIEF DESCRIPTION OF THE DRAWINGS

The present invention will be more apparent from the following detailed description taken in conjunction with the accompanying drawings in which.

DETAILED DESCRIPTION OF THE PREFERRED EMBODIMENT

Figure 2:
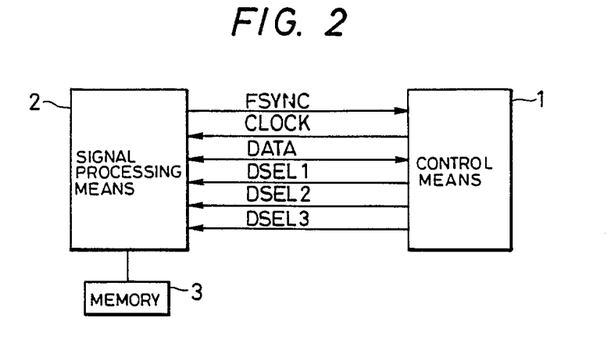
FIG. 2 is a block diagram showing an embodiment of the information recording/reproducing apparatus according to the present invention.

FIG. 2 is a schematic block diagram showing a general concept of the information recording/reproducing apparatus according to the present invention.

A signal reproduced from a magnetic tape used as a recording medium is applied to a signal processing means 2. In the signal processing means 2, the signal is divided into sub-code data and PCM data after the signal has been subjected to 10-8 conversion and error correction by detecting the errors and correcting them to the extent possible. Next, the thus processed data are stored in a memory 3 such as a RAM or the like.

Figure 4:
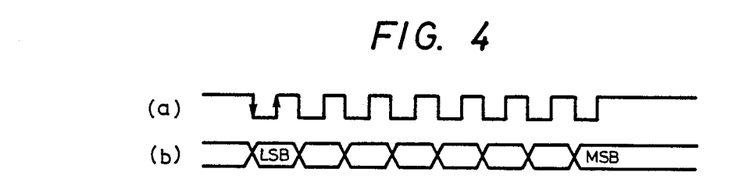
FIGS. 4 through 8 are respective timing charts of signals generated by the apparatus of FIG. 2.

A control means 1 formed by a microcomputer 1 and so on is arranged to produce selection signals (DSELs 1, 2, and 3) of three bits, when the signal processing means 2 is producing a permission signal (FSYNC), to thereby selectively designate particular data to be read out from the memory 3 and transferred. Further, at this time, the control means 1 produces a predetermined clock (CLOCK) signal (diagram (a) in FIG. 4). Data (diagram (b) in FIG. 4) which are produced from the LSB (least significant bit) thereof are changed at a trailing edge of a clock pulse and latched at a leading edge of a clock pulse.

Figure 11:
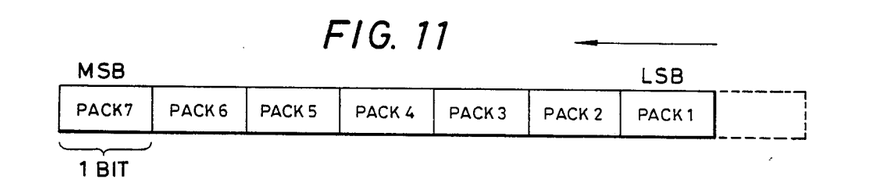

With reference to the table which follows below, data shown therein are read out and transferred in accordance with a particular selection signal. For example, when the control means 1 applies (001) as a selection signal to the signal processing means 2, the control means 1 also applies a pack control (CTL) signal as data (DATA) to the signal processing means 2 together with the selection signal (001). The pack CTL signal has a format of eight bits, as shown in FIG. 11. In the format, the bit corresponding to pack data to be read out is set to "0" and the remaining bits are set to "1". The bit ranking lower than PACK 1 can be omitted.

TABLE

| Selection signal 123 | Kind | Clock number | PB | PEC |
| --- | --- | --- | --- | --- |
| 001 | Pack CTL | 8 bits | I | — |
| 010 | ITEM data | 32 bits or less | O | — |
| 100 | Pack data | 448 bits or less | O | — |
| 011 | Mode Data | 16 bits | I | I |
| 101 | PCM-ID | 24 bits or less | O | I |
| 110 | SUB-ID | 24 bits or less | O | I |

Figure 12:
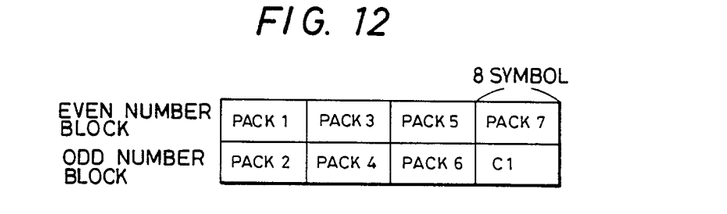

One pack is formed by eight symbols (one symbol beingformed of eight bits), and four packs are recorded in one block of data. Each of sub-code regions SUB-1 and SUB-2 is formed by eight blocks, and block addresses 0 through 7 are added to the blocks of the first sub-code region SUB-1 while block addresses 8 through F (in hexadecimal digits) are added to the blocks of the second sub-code region SUB-2. The PACKs 1, 3, 5, and 7 are recorded in the blocks of even number addresses, and the PACKs 2, 4, and 6 and an error correction code C1 associated with the PACKs 1 through 7 are recorded in the blocks of odd number addresses obtained by adding "1" to each of the respective, foregoing even number addesess (FIG. 12). Therefore, the respective pack data are written on one track in an octet state.

Figure 13:
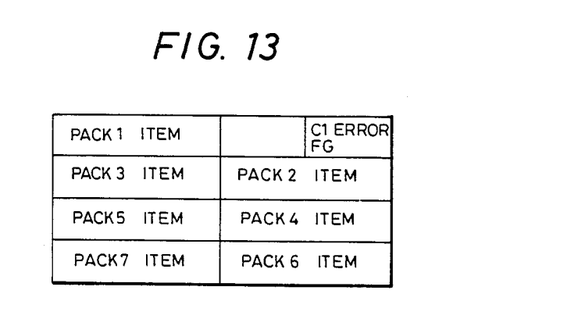

When the selection signal (010) is produced from the control means 1, ITEM data of four bits for each of the packs are produced from the signal processing means 2. The ITEM data for a pair of blocks, one even block and a successive odd block, are produced in such a format as shown in FIG. 13. After an error in the data read out of the magnetic tape has been corrected, a C1 error correction flag (FG) of two bits corresponding to the correction is stored in the memory 3 together with the data. The C1 error correction flag (FG) of two bits is set as follows: (00) when no correction is performed; (01), when one symbol correction is performed; (10), when two symbol corrections are performed; and (11) when correction cannot be performed.

Figure 6:
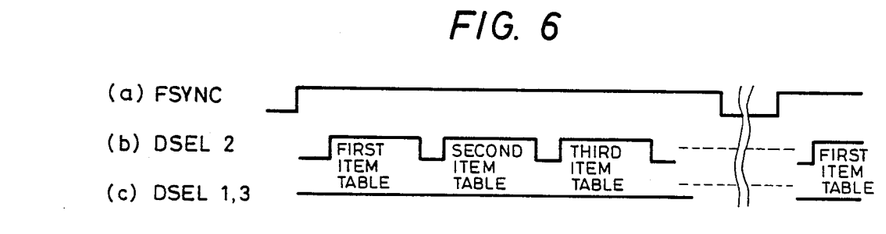

In the case where ITEM data, e.g., of three blocks or more, are to be read out, the selection signal representing the necessary number of times is changed from (000) into (010) when a permission signal (diagram (a) of FIG. 6) is being produced. (Diagrams (b) and (c) of FIG. 6 represent the second bit and the first and third bits of the selection signal respectively.) At that time, the signal processing means 2 successively outputs the ITEM data which have a C1 correction flag other than the C1 correction flag (11), i.e. correction flags (00), (01) and (10) representing correct and corrected (correctable) data, and then successively puts out incorrect (uncorrectable) ITEM data after completion of output of the correct and corrected ITEM data. In contrast, in the case where the data ID is not (0000), that is when the data are not audio data, ITEM data are not outputted.

Figure 7:
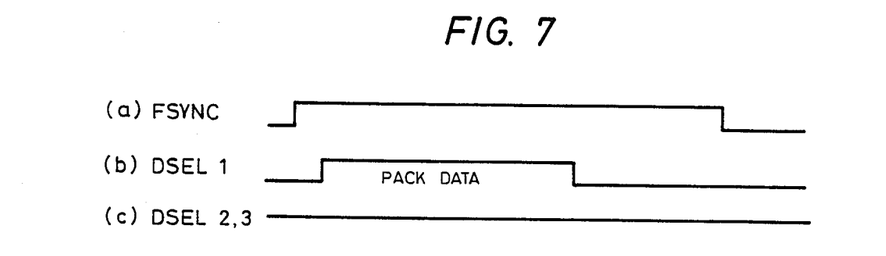
Figure 14:
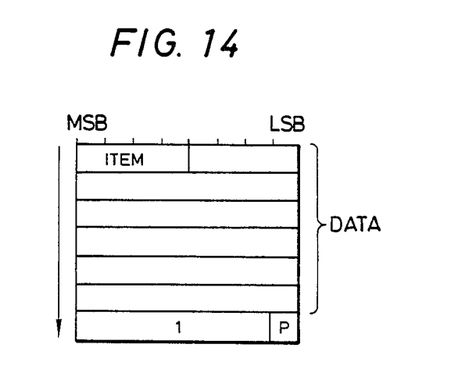

Upon reception of the selection signal (100) (diagrams (b) and (c) of FIG. 7) while the permission signal (diagram (a) of FIG. 7) is outputted, the signal processing means 2 outputs pack data. The data for one pack are arranged as shown in FIG. 14, and the upper-rank four bits of the first one byte of the data represent the foregoing ITEM data. The last one byte of the data represents a longitudinal parity. The last byte contains a code P having dummy data during recording, and a "0" or "1" when the apparatus is OK (ready) or NG (no good) for reproduction, respectively.

Figure 8:
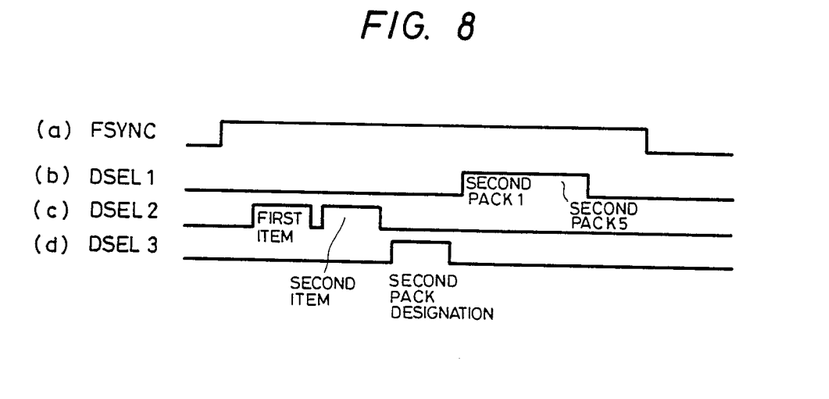

For example, when the selection signal (010) is put out twice (diagrams (b), (c) and (d) of FIG. 8) while the permission signal (diagram (a) of FIG. 8) is produced, ITEMs for two correct (or corrected) pack data are successively read out. After determination of packs to be read out from the ITEMs, the selection signal (001) is put out (diagrams (b), (c) and (d) of FIG. 8), and at the same time, for example, the PACKs 1 and 5 of the second block pair are designated by the pack CTL signal. Further, upon input to the signal processing means 2 of the selection signal (100), data of the PACKs 1 and 5 of the second block pair are read out.

Upon input of the selection signal (011), mode data necessary for future use are read out and transferred.

Figure 15:
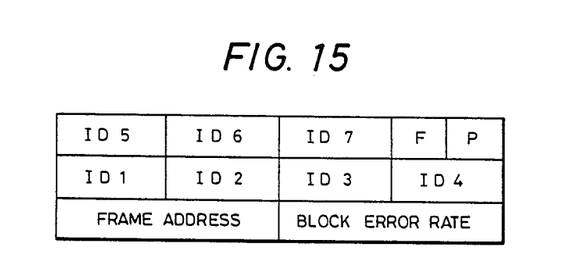

Upon input of the selection (101), data which are not a sub-code signal but include an ID code (PCM-ID) recorded in the PCM region and which are arranged as shown in FIG. 15, are put out. The PCM-ID represents information including identification as to whether or not data are audio data, and information relating to emphasis, a sampling frequency, the number of channels, and so on. Further, F represents a flag representing coincidence of a frame, and P is a code which contains dummy data during recording but is set at "0" or "1" when OK or NG for reproduction, respectively. They are recorded only when recording data are changed.

Figure 16:
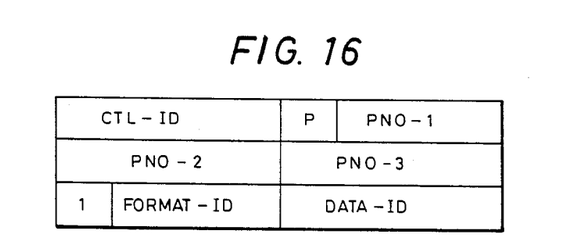

Upon input of the selection signal (110), data arranged as shown in FIG. 16 are outputted. In the drawing, the control ID (CTL-ID) represents a starting ID, a shortening (skipping) ID, or the like; the format ID (FORMAT-ID) represents the number of packs in the sub-code regions; and the data ID (DATA-ID) represents the kind of data (whether or not the data are audio data). Further, PNO-1, PNO-2, and PNO-3 are program number IDs representing the program number, a read-in region, a read out region, and so on. Similar to the foregoing case, a signal P is set at "0" or "1" when OK or NG, respectively. They are recorded on the magnetic tape only when recording data are changed.

Figure 1:
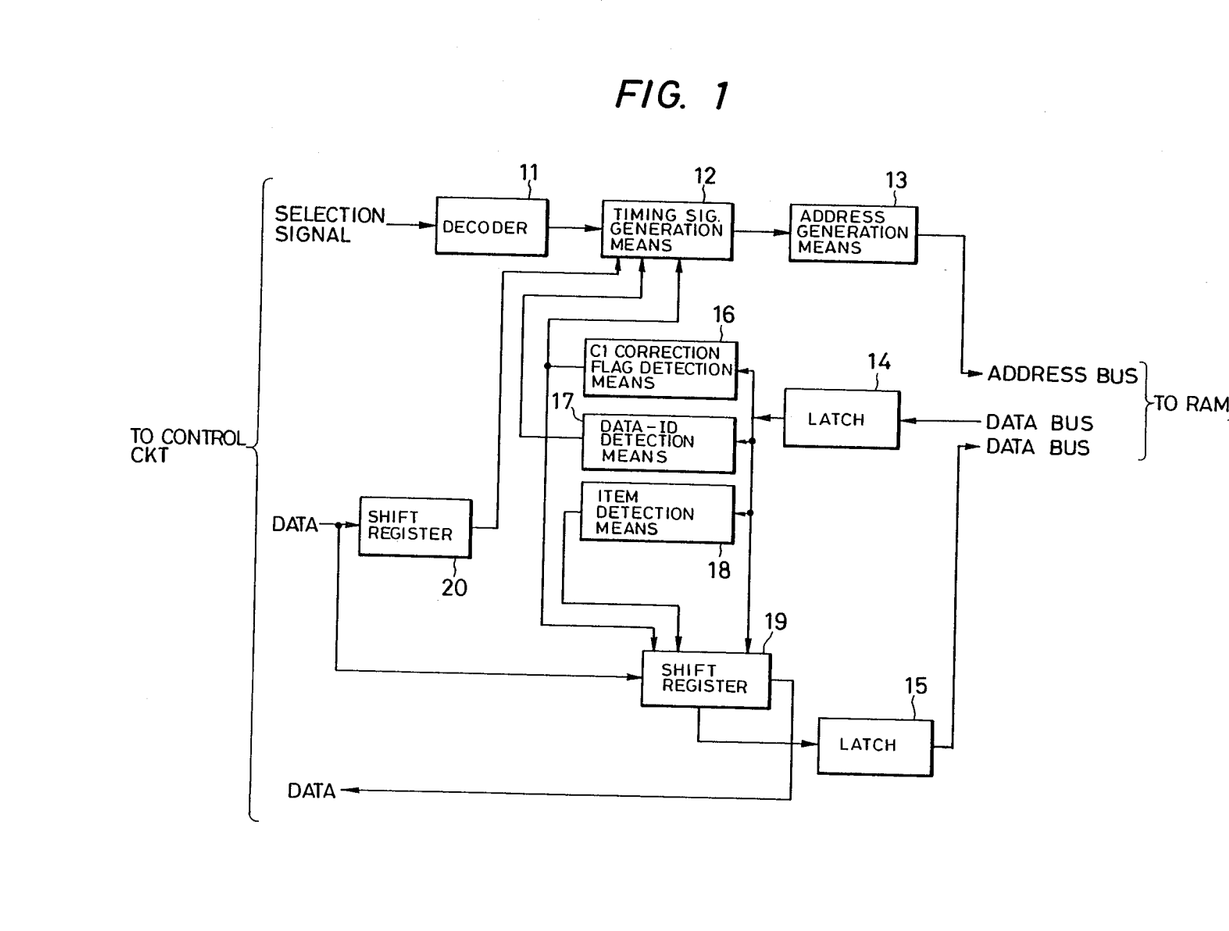
FIG. 1 is a block diagram showing the signal processing means according to the present invention.

FIG. 1 is a block diagram showing in detail the arrangement of the signal processing means 2 in the case where pack information is processed. When data are to be stored into the memory 3 from the control circuit 1, the data are transferred to the memory 3 via a shift register 19 and a latch circuit 15.

The data stored in the memory 3 are read out as follows: The selection signal (010) (for ITEM data) produced by the control means 1 is applied to a decoder 11 for decoding and the decoded signal is applied to a timing signal generation means 12. The timing signal generation means 12 outputs a predetermined timing signal to an address generation means 13 corresponding to signals produced from a C1 correction flag detection means 16 and a data ID detection means 17. The address generation means 13 generates a predetermined address signal corresponding to the timing signal, the address signal being applied to the memory 3 through an address bus.

Figure 9:
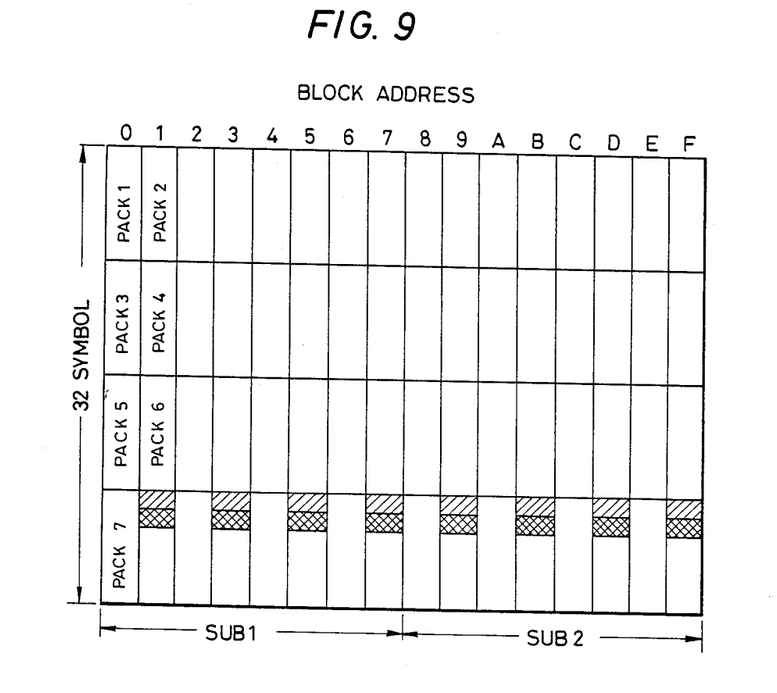
FIG. 9 is a diagram for explaining the state in which data are stored in the memory of the apparatus of FIG. 2.

In the memory 3, pack data reproduced from the magnetic tape are stored as shown in FIG. 9. That is, sub-code data of eight blocks reproduced from each of two sub-code regions SUB1 and SUB2 of one inclined track are successively stored for each block. At that time, the C1 correction flag (a hatched portion in the drawing) and the ID or the format ID (a reticulated portion in the drawing) are stored in data of the last eight symbols of each block having an odd number block addres (in hexadecimal digits).

The address generation means 13 first produces the addresses of the last eight symbols of the odd number (1, 3, 5, ...D, F) blocks, so that the data having the eight symbols including the C1 correction flag and the data ID are the first data read out from the memory 3. The thus read out data are latched by a latch means 14.

Next, the data ID detection means 17 detects the data ID in the data latched by the latch means 14. When the data ID is not (0000), that is, when the data are not audio data, the data ID detection means 17 sends a signal to the timing signal generation means 12 to read out data of the last eight symbols of a succeeding odd address block. When the data ID is (0000), that is, when the data are audio data, the timing signal generation means 12 checks the output of the C1 correction flag detection means 16. The C1 correction flag detection means 16 is arranged to detect the C1 correction flag in the data latched by the latch means 14 and apply a detection signal to the timing signal generation means 12. When the C1 correction flag is (11), that is, when the data are uncorrectable, the timing signal generation means 12 reads out the last eight symbols of data of a succeeding odd number address block.

Figure 10:
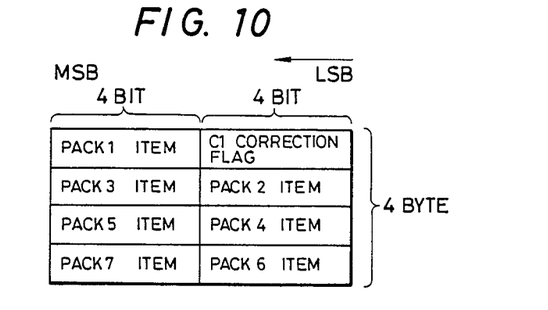
FIGS. 10 through 16 are diagrams for explaining the formats of respective data to be produced in the apparatus of FIG. 2.

When the C1 correction flag is not (11), that is, when the C1 correction flag is (00), (01) or (10) (data are not incorrect), the timing signal generation means 12 reads out data of the succeeding odd number block as well as data of an even number block having an address obtained by subtracting "1" from that of the foregoing odd number block in order from PACK 1 to PACK 7. An ITEM detection means 18 detects the position of ITEM data in the data which have been read out as described above and latched by the latch means 14, and produces a detection signal to the shift register 19. Therefore, each of the ITEM data from the PACK 1 to the PACK 7 in the data latched by the latch means 14 are successively fed to the control means 1 in this order following the C1 correction flag. FIG. 10 shows an example of the format of the output signal in this case.

The foregoing operation is performed for each selection signal (010) received by the signal processing means 2. Upon receiving the selection signal (010) after completion of the foregoing operation to the last odd number block address (F), the data having the C1 correction flag (11) are read out by a new operation which is the same as the foregoing operation. Also, similar to the foregoing operation, the new operation is performed only when the data ID is (0000).

The control means 1 reads out the ITEM data of the packs and determines and selects the necessary pack (that is, the pack to be read out) from the rest of the packs. When the pack to be read out is determined, the control means 1 applies the selection signal (001) to the timing signal generation means 12 through the decoder 11, and applies pack control data (of a format as shown in FIG. 11) to the timing signal generation means 12 through a shift register 20. At that time, the timing signal generation means 12 applies the pack control data representing the pack designated through the address generation means 13 to the control means 1 through the latch means 14 and the shift register 19.

Figure 5:
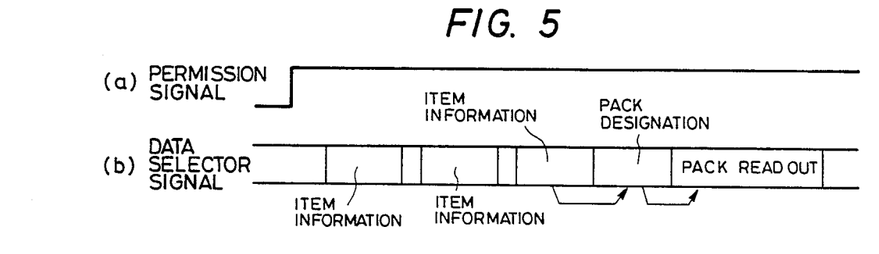

As described above, the foregoing operation (diagram (b) of FIG. 5) is performed only when the permission signal (diagram (a) of FIG. 5) is being applied from the signal processing means 2 to the control means 1.

Figure 3:
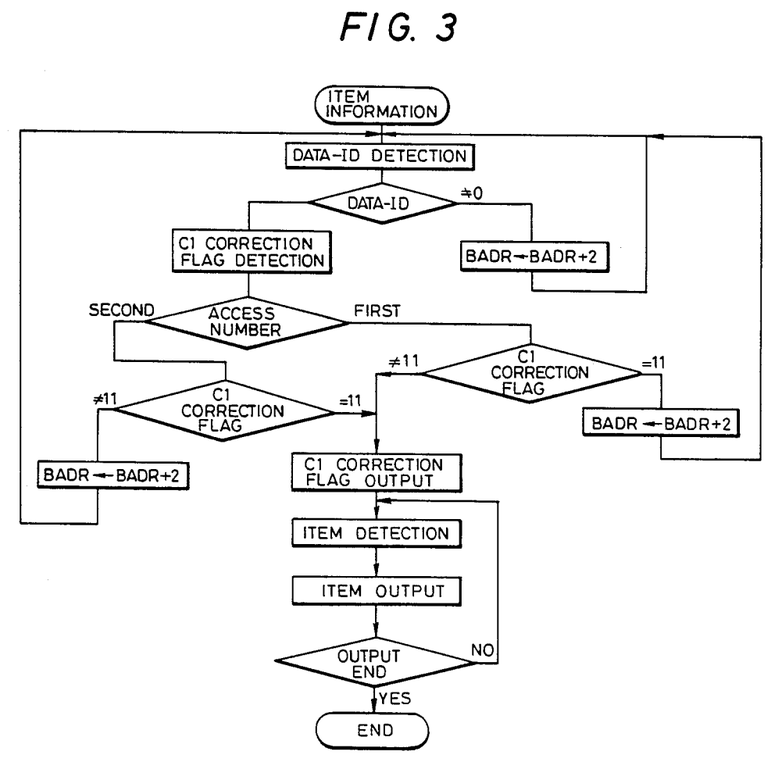
FIG. 3 is a flowchart for explaining the operation of the signal processing means.

FIG. 3 shows a flowchart for executing the above described operation. In the drawing, the step labelled "access number" refers to whether or not the read out operation of the data in the block is being conducted for the first time (i.e., the time when the correct data is to be read out) or the second time (i.e., the time when the uncorrectable data is to be read out). Further, BADR represents a flag.

As described above, the information recording/reproducing apparatus according to the present invention comprises a memory for storing a signal reproduced from a recording medium together with a correction flag corresponding to the signal, address generation means for generating a predetermined address corresponding to a selection signal for selecting data stored in the memory, and detection means for detecting the correction flag in the data read out of the memory, so that the data corresponding to the correction flag representing correct data are read out with priority to other data. Therefore, it is possible to read out data efficiently and accurately in a short time without putting a large strain on the control means, so that the information recording/reproducing apparatus according to the present invention can be effectively used particularly in the case where the number of flags representing uncorrectable data is increased, for example, in the case where the recording medium is searched for a desired program at a high speed in comparison with the normal recording/reproducing state.

What is claimed is:

1. An information recording/reproducing apparatus comprising:
   means for reproducing a signal containing a plurality of data from a recording medium;
   correction means for correcting said data and associating with each of said data a respective correction flag representing correct data or incorrect data;
   a memory for storing said data together with said correction flag corresponding to said data;
   means for selecting data stored in said memory for read out; and
   circuitry means for reading out said correct data prior to other data of said data selected for read out from said memory.

2. An information recording/reproducing apparatus according to claim 1, wherein said circuitry means includes detection means for detecting whether said correction flag associated with said data selected for read out from said memory corresponds to correct or incorrect data.

3. An information recording/reproducing apparatus according to claim 2, wherein said detection means outputs a detection signal when said data selected for read out corresponds to correct data, and said circuitry means further includes means, responsive to said detection signal, for reading out from said memory said correct data.

4. An information recording/reproducing apparatus according to claim 1, wherein said means for selecting data includes means for generating a selection signal for selecting data stored in said memory, and address generation means for generating a predetermined address in accordance with said selection signal.

5. An information reproducing apparatus, comprising:
   means for reproducing a signal from a recording medium, said signal including a plurality of data;
   signal processing means, receiving said reproduced signal, for correcting each of said plurality of data and generating a flag associated with each of said data, said flag indicating that said data is correct data or incorrect data;
   a memory for storing said data in association with said flag;
   control means for generating a selection signal to read-out particular data from said memory, wherein said signal processing means includes address generation circuitry means for generating a predetermined address corresponding to said particular data to be read-out from said memory, and detection means for outputting a first detection signal when said correction flag associated with said data read-out from said memory corresponds to correct data, said address generation circuitry means being responsive to said first detection signal for reading out any correct data, within said particular data, from said memory prior to reading out any other data within said particular data.

6. An information reproducing apparatus according to claim 5, wherein said selection signal comprises a first selection signal and a second selection signal, said address generation circuitry means being responsive to said first detection signal for reading out said correct data in response to said first selection signal, and being responsive to said second selection signal and a second detection signal outputted by said detection means when said correction flag corresponds to incorrect data for reading out said incorrect data within said particular data, said second selection signal being generated after all of said correct data has been read out.

7. An information reproducing apparatus according to claim 6, wherein said plurality of data comprises a plurality of successive data blocks each having a predetermined address, said address generation circuitry means being adapted for generating said predetermined address of a next one of said successive data blocks in response to said first selection signal and said second detection signal, and for generating the predetermined address of the next one of said successive data blocks in response to said second selection signal and said first detection signal.

8. A method of reproducing a signal from a recording medium, said signal including a plurality of successive blocks of data, said method comprising the steps of:
   (a) reading said signal from said recording medium;
   (b) correcting any errors in said blocks of data;
   (c) generating a correction flag for said blocks of data for indicating whether said data is correct or incorrect;
   (d) storing said blocks of data with said flag associated therewith at a block address;
   (e) generating a first selection signal;
   (f) reading out all correct data from said blocks of data in response to said first selection signal by:
      (i) selecting one of said blocks of data for reading out data therefrom and generating an address signal corresponding to said one of said blocks of data in response to said first selection signal;
      (ii) detecting said correction flag associated with said one of said blocks of data; and
      (iii) reading out any correct data from said one of said blocks of data in response to detection of a correction flag indicating correct data, thereafter returning to said step of selecting to select a next one of said blocks of data for reading out said data; or, returning to said step of selecting a next one of said blocks of data for reading out said data in response to detection of a correction flag indicating incorrect data; and
   (g) generating a second selection signal after reading out all correct data from said blocks of data;
   (h) reading out all incorrect data in response to said second selection signal by:
      (i) selecting one of said blocks of data for reading out data therefrom and generating an address signal corresponding to said one of said blocks of data in response to said second selection signal;
      (ii) detecting said correction flag associated with said one of said blocks of data; and
      (iii) reading out any incorrect data from said one of said blocks of data in response to detection of a correction flag indicating correct data, thereafter returning to said step of selecting a next one of said blocks of data for reading out said data; or, returning to said step of selecting a next one of said blocks of data for reading out said data in response to detection of a correction flag indicating correct data.

* * * * *